March 18, 1952     J. J. FRANK ET AL     2,589,792
PLEATING MACHINE

Filed March 21, 1947     4 Sheets-Sheet 1

INVENTOR.
JOSEPH J. FRANK
JAMES C. MACY
BY
ATTORNEY

INVENTOR.
JOSEPH J. FRANK
JAMES C. MACY
BY
John R. Seymour
ATTORNEY

March 18, 1952  J. J. FRANK ET AL  2,589,792
PLEATING MACHINE
Filed March 21, 1947  4 Sheets-Sheet 3

INVENTOR.
JOSEPH J. FRANK
JAMES C. MACY
BY
John R. Seymour
ATTORNEY

March 18, 1952     J. J. FRANK ET AL     2,589,792
PLEATING MACHINE
Filed March 21, 1947
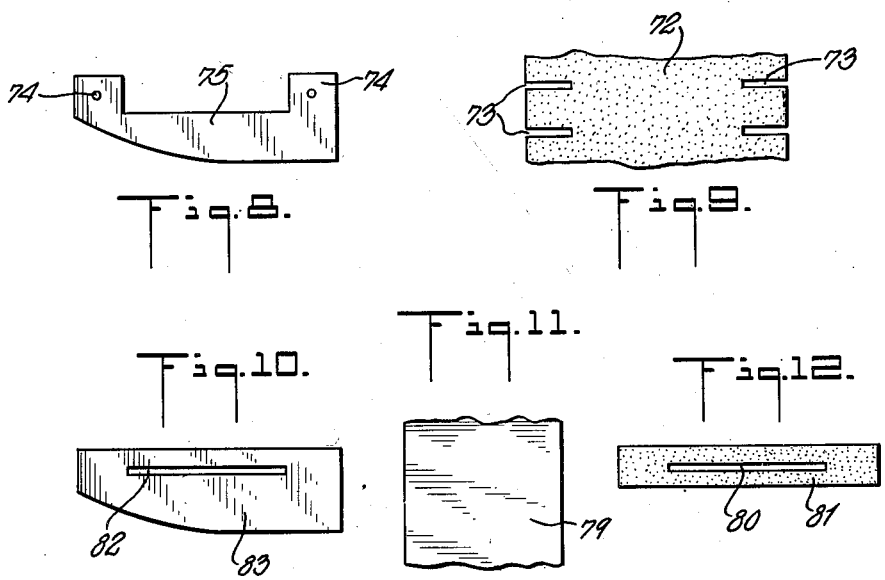
INVENTOR.
JOSEPH J. FRANK
JAMES C. MACY
BY
John R. Seymour
ATTORNEY Patented Mar. 18, 1952

2,589,792

UNITED STATES PATENT OFFICE 2,589,792

PLEATING MACHINE

Joseph J. Frank, Union, and James C. Macy, Elizabeth, N. J., assignors to Hercules Fasteners, Inc., a corporation of New Jersey Application March 21, 1947, Serial No. 736,240

5 Claims. (Cl. 270—83)

This invention relates to a pleating machine and has particular relation to the making of sausages. The invention will be described primarily in its relation to the particular art of making sausages, but it is to be understood that this particular description is adopted for purposes of expediency and does not constitute a limitation.

For hundreds of years sausages have been made by filling a tubular casing with foodstuffs. The casing has been tied at one end with string, filled with the food product, such as sausage meat, or cheese, and has then been tied with string at the other end. In United States Patent No. 2,493,063, the art was shown how to seal a sausage casing in a better and more sanitary way by employing an eyelet seal. In that invention, the end of the sausage casing, which is a simple tube of edible transparent material such as regenerated cellulose, is flattened at one end, pleated, gathered, and the eyelet is passed over the gathered pleats and clamped upon them. Heretofore, the pleating was done by hand or by use of simple pleating jaws. That method of pleating had a number of disadvantages, among which were these, that it sometimes tended to weaken the material of the casing, that it was time and labor consuming, and that it could not be done as rapidly as the pleated tubes could be eyeleted.

It is an object of this invention to pleat tubular material of sausage casing type at a rate equal to that at which the eyelets can be applied.

Another object is to mechanically pleat tubes without straining the material.

A further object is to reduce the cost of the pleated casings by increasing the efficiency with which they are produced.

Another object of the invention is to employ the new machine and the new process in all fields of industry where pleating is accomplished, including among others the clothing industry, and to accomplish the pleating even upon delicate material without strain.

The objects of the invention are accomplished, generally speaking, by carrying out the pleating progressively, which includes one pleat after another and also pleating in successive groups. The principles of the mechanism by which this is accomplished are set forth by means of illustrative embodiments hereinafter. It is to be understood, however, that the drawings are for purposes of illustration only and do not constitute a limitation of the invention, reference for this latter purpose being primarily to the appended claims.

In the drawings,

Fig. 8 is an elevational view of a tooth useful with the crimper of Fig. 4;

Fig. 9 is a plan view of part of a rubber spring;

Fig. 10 is an elevational view of a tooth useful with the crimper of Fig. 6;

Fig. 11 is a plan view of a part of the spring of Fig. 6;

Fig. 12 is an end view of a rubber spacer of Fig. 6.

Figure 1:
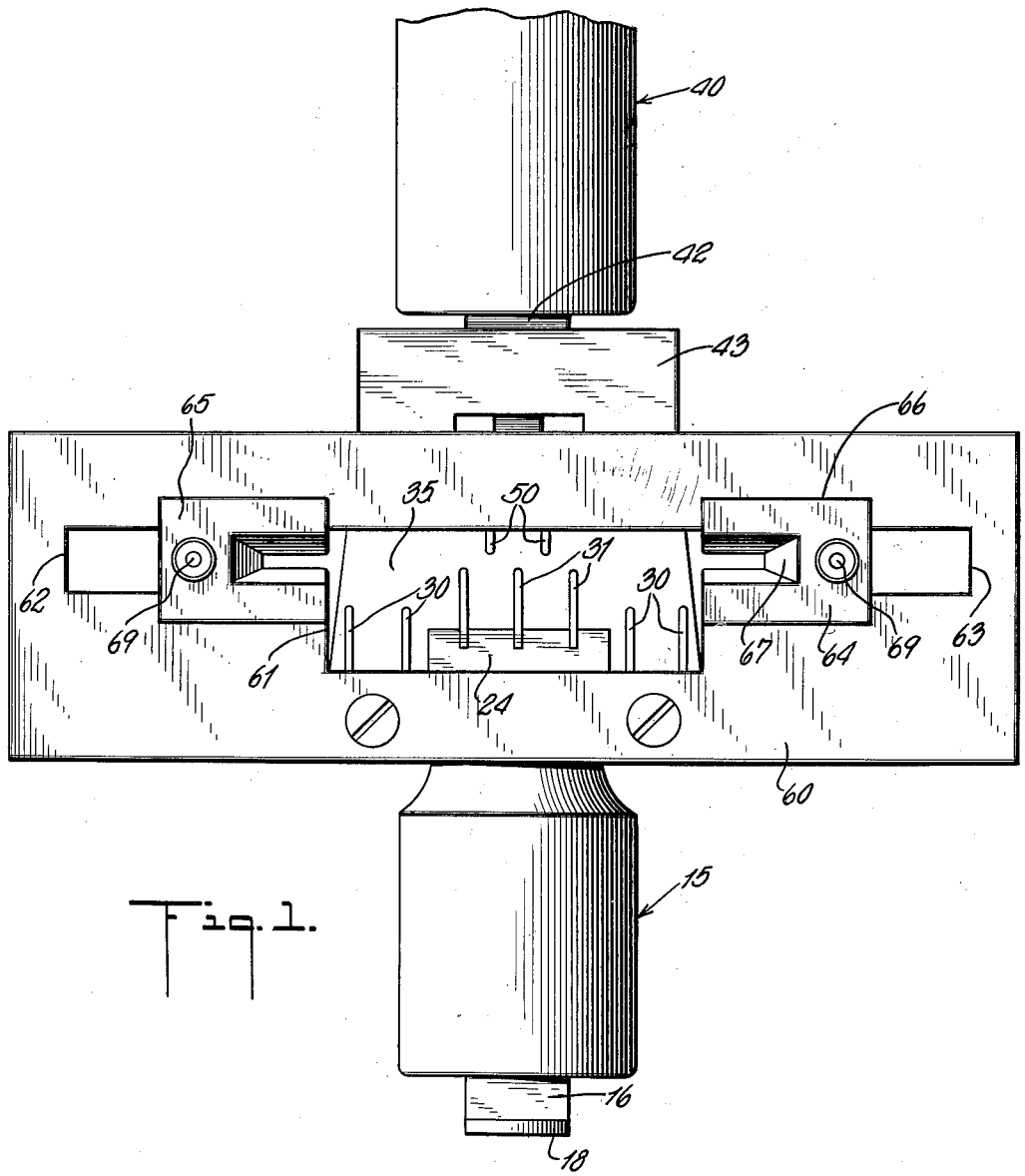
Fig. 1 is an elevational view of a preferred form of the pleater from the feeding side.
Figures 2, 3:
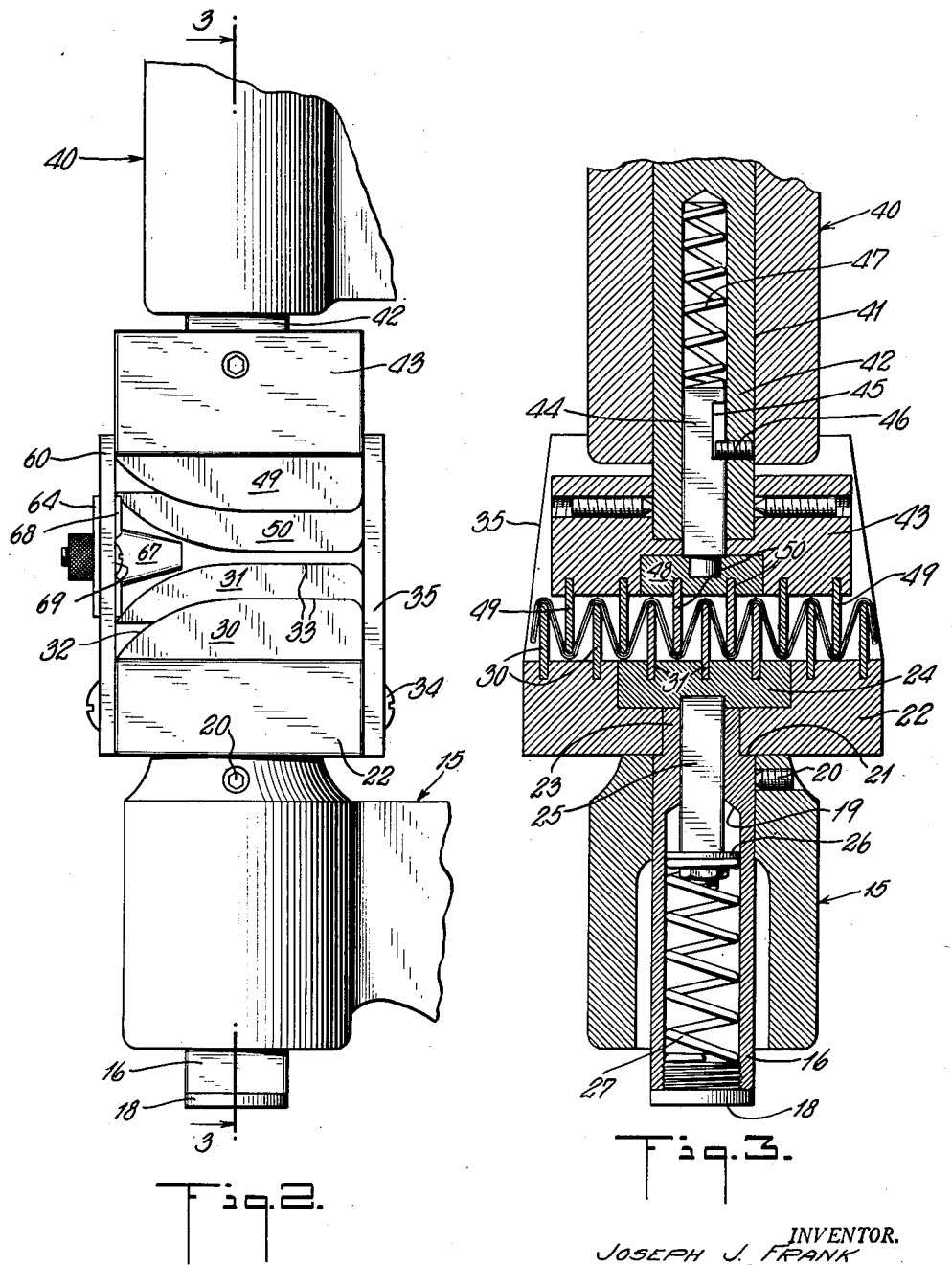
Fig. 2 is a side view of this pleater.
Fig. 3 is a vertical section on line 3—3 of Fig. 2, showing pleated material.
Figure 4:
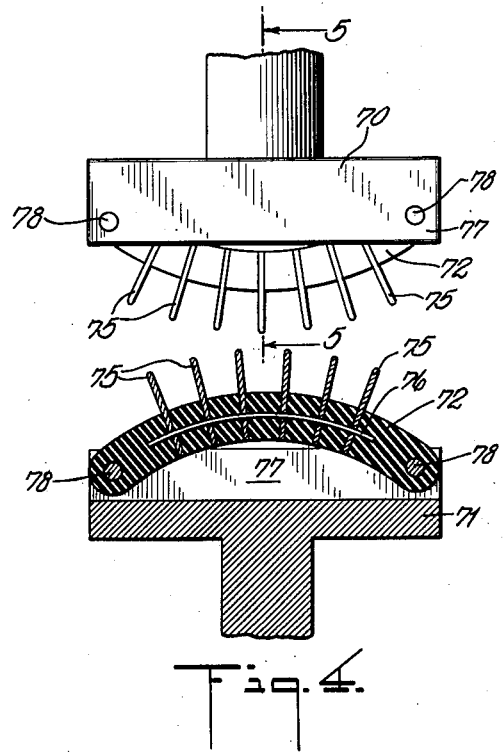
Fig. 4 is a vertical view of the jaws of a modified form of crimper, the upper jaw being in elevation and the lower in section.

The structure of Figs. 1 and 2 represents a preferred embodiment of the invention. In these figures the power linkage and frame are omitted in order to raise the operative parts to a larger scale. The power linkage and frame may be of the kind shown in our prior application on the sealer, or of any other satisfactory press type adapted to move one or both of a pair of jaws toward and away from each other to engage flexible material placed between them. Such mechanical motions are generally known and may satisfactorily be of manual or power operated reciprocating type.

In Figs. 1 to 3, a lower fixed frame member 15 is provided with a square hole in which is received a square dowel 16 of hollow conformation opening upward and closed at its lower end by screw threaded cap 18. The hollow part of the dowel is reduced at its upper end to form a limit stop 19. The dowel is held in the frame member by a set screw 20. At its upper end the dowel is externally reduced to form a shoulder 21 upon which rests the lower jaw 22. The end 23 of the dowel extends into the jaw 22 and is temporarily or permanently affixed thereto.

The jaw 22 is channel shaped, as seen in Fig. 3, having elevated ends and a reduced mid-portion of rectangular shape in which a block 24 fits. The hollow at the top of the dowel is square and admits a fitting square pin or stud 25 upon which the block is fixed. The stud extends into the larger part of the hollow and is provided with a head 26 that cooperates with shoulder 19 to limit its upward motion. The head is shown as a washer held on by a nut. Bearing at one end upon the washer 26 on pin 25 and at the other upon the cap 18 is a spring 27 that biases the block outward to a position in advance of the raised ends of the jaw, and permits the block to be retracted to a position even with the top of the jaw when enough pressure is applied to overcome the strength of the spring.

Mounted in the jaw and in the block, which is effectually a movable part of the jaw, are pleating teeth 30—31. These teeth are long, narrow, flat sided, and have ends 32 of sweeping curvature leading to flat portions 33 of considerable length. The construction of these teeth reduces the power required for pleating.

Attached to the back of jaw 22 by screws 34 is a plate 35 that extends above the most elevated position of teeth 31 and covers the gap back of the lower pleating teeth and the upper teeth.

The upper support 40 is reciprocable. It has a hole 41 in which a square hollow dowel 42 is received. The dowel carries upper jaw 43 of construction similar to that of the lower jaw, and similarly attached. The hollow of the dowel encloses a stud 44 having a cut out portion 45 forming limit stops by contact with screw 46 that serves as an abutment to limit its motion. A spring 47 within the dowel presses upon the stud and forces the block 48 carried by the stud downward in advance of the other parts of jaw 43. Teeth 59—50, of like construction, are mounted in jaw 43 and block 48 in interdental alignment with teeth 30—31.

In separated position the teeth are spaced sufficiently to admit the material to be pleated, as shown in Fig. 2.

The material is aligned by a guide 60 carried by the lower frame member 15, which is composed of a plate 60 having an opening 61 having extensions 62—63.

In the extensions are two movable guide members 64—65. Each guide member has an outer flange 66 that bears against the face of plate 60, and a three sided guide funnel 67 having tapered sides and opening toward its cooperating guide. A screw 69 bears on a clamp 68 and holds the guide in selected position. The wider center part of the guide plate serves to permit the unobstructed forming and withdrawal of the pleats.

If it be assumed that the upper jaw is reciprocated by a foot treadle, the guides 64—65 are set at the proper length, the end of a sausage casing is thrust through the apertures 67 and up against plate 35, and the upper jaw is brought down. The teeth 50—31 engage first and draw the material freely past teeth 30—49 into central pleats, then the edges of the block teeth engage the opposite blocks through the pleats, compress the springs, and force the blocks into retracted position, while the teeth 30—49 come into action and pleat the ends of the casing.

By this conception of pleating progressively, straining the material and stretching during pleating is avoided. The result is usually best when the progressive pleating is carried out from the center toward the ends.

A valuable alternative form of the invention is shown in Figs. 4 to 12. In those figures the numerals 70—71 represent upper and lower jaws either or both of which may be reciprocable. Carried by the jaws are curved springs. The curved spring 72 of the lower jaw is a curved block of resilient rubber having edge slots 73 to receive the end tabs 74 of teeth 75. When the teeth are inserted in the slots wires 76 are passed through holes in the tabs to hold them in position. The spring is arcuate and the slots are preferably radial to the arc, aligning the teeth radially. The wires stop short of the ends of the springs in the form shown. The upper jaw is like the lower, the teeth being interdentally aligned. When the jaws are moved together the center teeth start the crimping, which proceeds thence progressively toward the ends. When the teeth engage the spring it is compressed and flattened and the teeth move toward parallelism, gathering the pleats.

The teeth may be moulded in the rubber if desired, in which case the wires may or may not be used. A satisfactory jaw 70 is flat from end to end and has flanges 77 to which the ends of the compressible springs are attached by pins 78.

Figure 6:
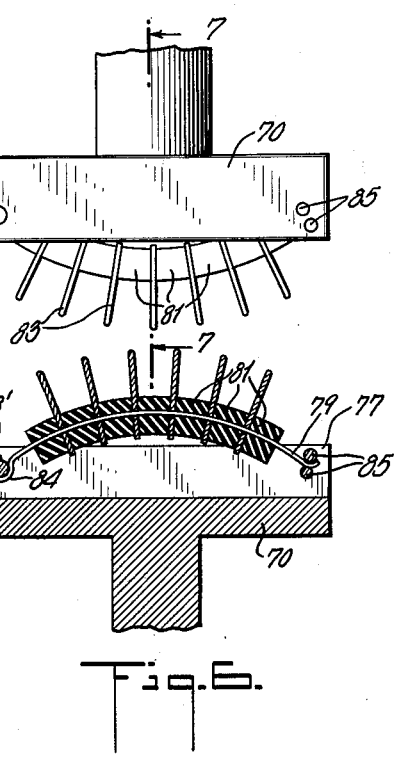
Fig. 6 is a modification of the apparatus of Fig. 4.
Figure 5:
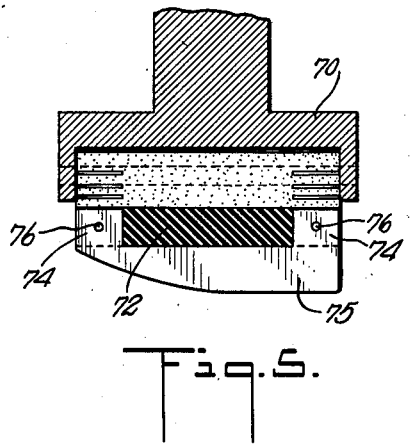
Fig. 5 is a cross section on line 5—5 of Fig. 4.
Figure 7:
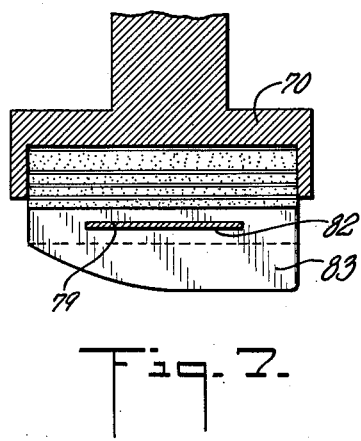
Fig. 7 is a cross section on line 7—7 of Fig. 6.

In a modification of this form of the invention, shown in Figs. 6 and 7, a flat steel spring 79 passes through slots 80 in flexible rubber spacers 81 and slots 82 in teeth 83. The method of assembly is shown in Fig. 6. One end of the spring is anchored as at 78', by forming an eye 84 in the end of the spring, and the other end is free to slide between retainers 85 such as pins mounted in the flanges 77 of a jaw such as 70.

An advantage of this invention is that material having a plurality of plies such as a sausage casing, or a plurality of leaves, or several thicknesses of cloth, can be pleated without stretching the material because the central portion is pleated, and the end portions are therefore allowed to glide with relative freedom between the outer teeth, being thereafter progressively gathered in the pleat until the operation is completed.

Another advantage of the invention is in the speed with which the pleating operation is accomplished, it being completed in a single stroke of the pleating jaws. Thus, a single machine may accomplish the pleating and the sealing, a single reciprocating member may, for example, carry side by side, pleating and sealing means. The operator may put the tube between the pleating teeth, and gather and withdraw the pleats in the first stroke of the machine, eyelet the pleated end and seal it in the second stroke of the machine. Separate machines may also be used to accomplish the same result, the pleating being completed in one and the sealing in another.

Another advantage of the invention is in reducing the cost and improving the efficiency of the mechanical sealing of tubes.

Yet another advantage of the invention is that it particularly facilitates the pleating of tubular bodies by limiting the deep pleat to a very limited width of the pleated material, leaving the portions adjacent thereto free to assume the circular end formation that is most desirable.

A still further advantage of this invention is in the construction of the pleating teeth because, by constructing them in the form shown, but little power is required for pleating, whereas many times the power is required when they are otherwise constructed.

As many apparently widely different embodiments of the present invention may be made without departing from the spirit and scope thereof, it is to be understood that the invention is not limited to the specific embodiments, except as defined in the appended claims.

What is claimed is:

1. In a pleating device spaced press members, jaws having spaced flat teeth in interdental alignment mounted on said members by means of hollow dowels, springs within the hollow dowels, studs bearing upon the springs and having limited ranges of motion thereagainst, and blocks carried by the studs bearing interdentally aligned flat teeth, the blocks protruding beyond their respective jaws and being sufficiently spaced to admit flexible material between them in non-pleating position, and the springs having enough strength to pleat flexible material over the block teeth first.

2. A pleating device including opposed, interdentally aligned blunt pleating teeth adapted to engage and pleat flexible material, said teeth providing a free space transverse to their operative edges in their open position, a guide for the flexible material including a plate having a slot positioned before the teeth, and movable guide members adjustable for width mounted in the slot and having notches aligned with the said transverse space, said teeth having arcuate ends adjacent to and diverging before said slot.

3. A pleating machine having opposed jaws, each of which contains a plurality of long, thin, blunt edged pleating teeth, said teeth being of constant depth for a portion of their length from a common end thereof, said depth being continuously diminished from said first portion to the other end of said teeth so that the cooperating edges of said teeth on the respective jaws diverge, each said jaw holding its said teeth in interdental alignment with the teeth of the other said jaw.

4. In a pleating device spaced press members, jaws mounted on said members having opposed faces with projecting spaced pleating teeth in interdental alignment, a recess of limited depth in said face of one said jaw, a plunger stud passing through said recess and into said jaw, a block mounted on the plunger conforming in shape to the said recess, spring means biasing said block out of said recess, means to limit the motion of the block against the spring means, and pleating teeth on said block held in interdental alignment with teeth on said other jaw projecting beyond the teeth on the same jaw in the outward position of said block.

5. The pleating device of claim 4 in which the pleating teeth have blunt operating edges, said teeth being of constant depth for a portion of their length from a common end thereof, said depth being continuously diminished from said first portion to the other end of said teeth so that the cooperating edges of said teeth on the respective jaws diverge.

JOSEPH J. FRANK.
JAMES C. MACY.

REFERENCES CITED

The following references are of record in the file of this patent:

UNITED STATES PATENTS

| Number | Name | Date |
|---|---|---|
| 336,656 | McCreary et al. | Feb. 23, 1886 |
| 568,307 | Meisel | Sept. 22, 1896 |
| 1,290,800 | Teall | Jan. 7, 1919 |
| 1,700,099 | Shively | Jan. 22, 1929 |
| 1,887,680 | Hallman | Nov. 15, 1932 |
| 1,982,454 | Sanders | Nov. 27, 1934 |

FOREIGN PATENTS

| Number | Country | Date |
|---|---|---|
| 431,103 | Germany | June 29, 1926 |
| 463,105 | Germany | July 23, 1928 |